Aug. 25, 1970 L. GORAN, JR 3,525,262
ELECTRIC PRESSURE GAUGE
Filed Feb. 5, 1969
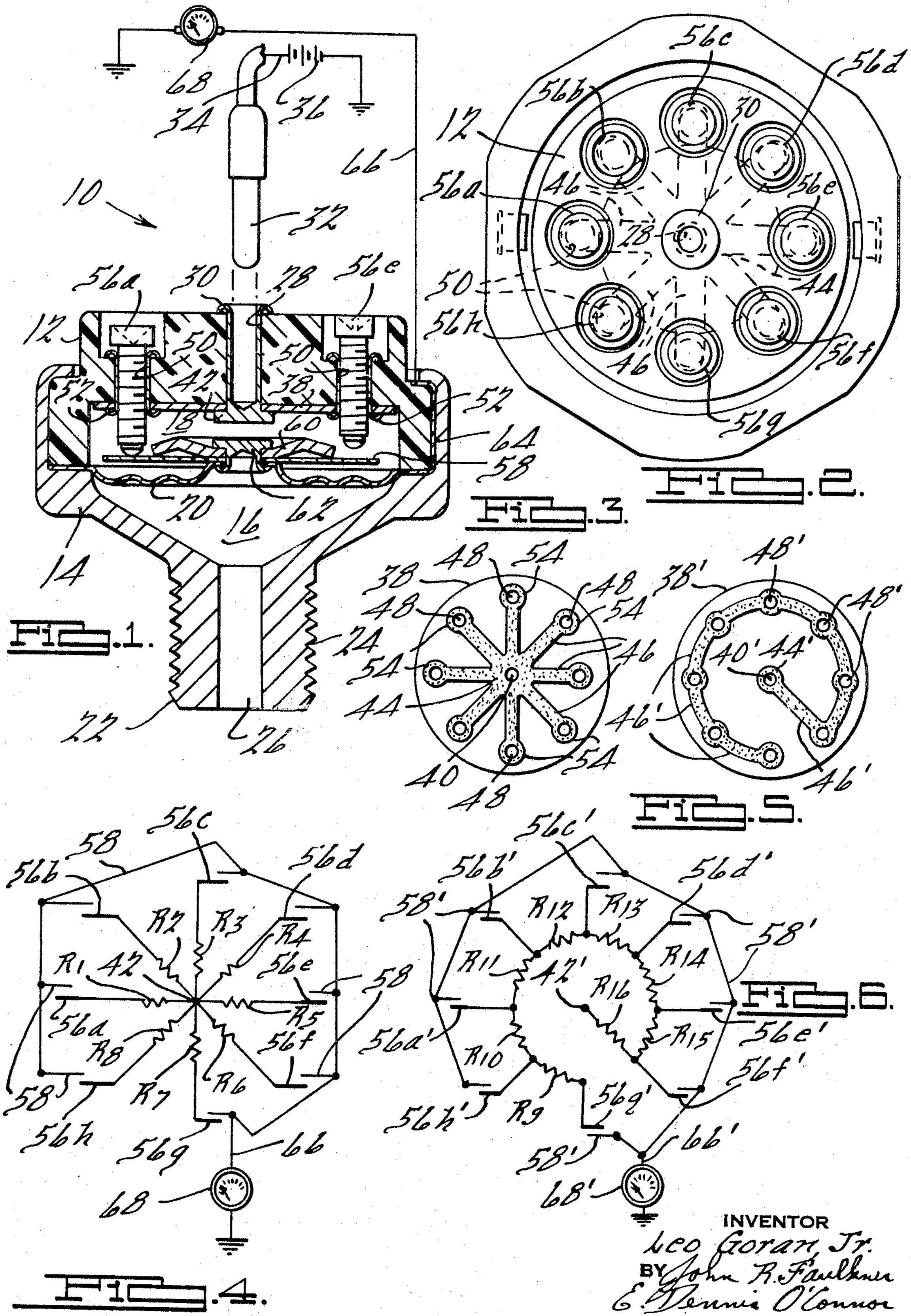
INVENTOR
Leo Goran, Jr.
BY John R. Faulkner
E. Dennis O'Connor
ATTORNEYS 3,525,262

ELECTRIC PRESSURE GAUGE

Leo Goran, Jr., Birmingham, Mich., assignor to Ford Motor Company, Dearborn, Mich., a corporation of Delaware Filed Feb. 5, 1969, Ser. No. 796,684
Int. Cl. G01l 9/02
U.S. Cl. 73—398 7 Claims

ABSTRACT OF THE DISCLOSURE

An electric pressure gauge including a switching plate assembly movable in response to pressure changes. Switching plate movement causes switching between a plurality of circuit paths, each having a different electrical resistance. An ammeter connected to the switching plate indicates a current value that varies as the pressure acting on the switching plate assembly.

BACKGROUND OF THE INVENTION

Pressure gauges utilized for applications such as monitoring the oil pressure of internal combustion engines must, of course, be extremely reliable because of the danger of destruction of such an engine if its is operated with insufficient lubrication. Known gauges that continuously indicate pressure have fallen into disuse in many internal combustion engine installations because the cost of manufacturing a sufficiently reliable instrument of this type is prohibitive. Such gauges have been replaced by so-called "warning light indicators" having a light source that is illuminated whenever oil pressure drops below a minimum acceptable value. These indicators may be designed to provide the requisite reliability at a reasonable manufacturing cost, but have the disadvantage of alerting an engine operator only when immediate corrective measures must be taken to restore oil pressure. In contrast, a gauge continuously informs the operator as to oil pressure condition.

It is an object of this invention to provide an electric pressure gauge that may be used to monitor continuously the oil pressure of an internal combustion engine. The gauge of this invention has a simple and reliable design and is constructed of easily fabricated parts and readily available "shelf items" in order to reduce manufacturing costs.

SUMMARY OF THE INVENTION

An electric pressure gauge constructed in accordance with this invention includes a housing defining a central chamber. An impervious resilient diaphragm is secured to the housing and divides the chamber into two parts. The housing includes conduit means formed therethrough and connecting one of the chamber parts to the source of pressure to be measured. An electrical circuit element is secured to the housing and positioned in the other of the chamber parts. This circuit element includes a plurality of electrical resistances. A plurality of electrical contacts are mounted by the housing with each of the contacts being electrically connected to at least one of the resistances. Each one of the contacts extends into the other chamber part a different distance than the remaining contacts. First electrically conductive means connect the circuit element to a source of current having a substantially constant electrical potential. The diaphragm normally is spaced from the contact and has an electrcially conductive switching member secured thereto for movement therewith. Second electrically conductive means connect the switching member to gauge means capable of measuring the electric current. Upon the diaphragm and the switching member maving toward the contacts in response to pressure present in said one chamber part, the switching member progressively is connected electrically to the contacts to vary the effective resistance of the circuit element. This change in resistance varies with the pressure to be measured and is indicated on the current measuring gauge.

DESCRIPTION OF THE DRAWING

FIG. 1 is a side elevation view, partially in section, of the electric pressure gauge constructed in accordance with this invention and includes a diagrammatic representation of a portion of the circuitry included in this gauge;

FIG. 2 is a plan view of a first embodiment of the invention;

FIG. 3 is a plan view of the printed circuit element included in the device of FIG. 2;

FIG. 4 is a diagram of the circuitry included in the device illustrated by FIG. 2;

FIG. 5 is a plan view of the printed circuit element included in a second embodiment of the invention; and FIG. 6 is a diagram of the circuitry included in the second embodiment of the invention that utilizes the printed circuit element of FIG. 5.

DETAILED DESCRIPTION OF THE INVENTION

Referring now in detail to the drawing and in particular to FIGS. 1 and 2, the numeral 10 denotes generally an electric pressure gauge constructed in accordance with this invention. This gauge included an upper housing member 12 constructed of electrically insulating material and a lower housing member 14. The upper and lower housing members are joined together to form a central cavity that is divided into a lower chamber 16 and an upper chamber 18 by a flexible, resilient diaphragm 20. This diaphragm is constructed of material that is electrically conductive, such as thin steel sheet.

The lower housing member 14 has formed thereon a collar 22 having external threads 24. These threads are adapted to engage mating threads on a pressure vessel that is the source of the pressure to be measured.

For example, collar 22 may be threaded into an opening in an internal combustion engine block in order to monitor the oil pressure within the engine. A conduit 26 extends through collar 22 and opens into lower chamber 16 so that the pressure to be measured is present within lower chamber 16.

Upper housing member 12 has extending therethrough a centrally located aperture 28. A female electrical terminal 30 is positioned in aperture 28 and is adapted to receive a male electrical terminal 32. The male terminal is electrically connected by means of conductor 34 to a source of electric current 36 having a substantially constant electrical potential. A suitable current source is an automotive type battery.

A printed circuit board 38 is secured to the uppermost inner surface of housing member 12. Circuit board 38 has formed therethrough a central aperture 40 that registers with aperture 28 in housing member 12. Female electrical connector 30 extends through apertures 28 and 40. An enlargement 42 located on the end of female terminal 30 proximate circuit board 38 is in intimate contact with a center portion 44 of an electrically conductive circuit element formed on circuit board 38.

As may be seen from FIG. 3, illustrating a first embodiment of printed circuit element utilized in this invention, printed circuit board 38 has a plurality of radially extending conductive elements 46 in circuit with central conducting portion 44. Each of these conductive element 46 comprises an electrical resistance and it may be seen from FIG. 3 that these resistances are connected in parallel circuit with one another. Proximate the end portion of conductive printed element 46, a plurality of apertures 48 are formed through circuit board 38.

Apertures 48 are formed through printed circuit board 38 to register with a plurality of holes 50 formed through upper housing member 12. One of a plurality of electrically conductive sleeves 52 is positioned in each one of the holes 50. Sleeves 52 have flanged end portions that are in electrical contact with printed conductive portions 54 that surround each of the apertures 48 of circuit board 38. A plurality of electrically conductive bolts 56*a*–56*h* extend through apertures 50 and coincidental apertures 48 of circuit board 38. It may be appreciated that each one of the bolts 56*a*–56*h* is electrically connected through a sleeve 50 and printed conductive portions 54 to one of the electrical resistances 46.

These bolts are positioned in housing 12 such that each of the bolts extends a different distance into upper chamber 18. As illustrated in the drawing, bolt 56*a* extends the greatest distance into chamber portion 18 and is followed by bolts 56*b* and 56*c* and so on; with bolt 56*h* having the shortest protrusion into chamber portion 18.

An electrically conductive switching plate 58 and a washer 60 are secured by means of rivet 62 to diaphragm 20 for unitary movement therewith. With no pressure present in lower chamber 16, diaphragm 20 is such that electrically conductive switching plate 58 will be located remote from bolt 56*a*. It readily may be appreciated that as pressure increases in chamber 16, diaphragm 20 and switching plate 58 will be forced upward until plate 58 contacts bolt 56*a*. Further increases in pressure will result in plate 58 progressively contacting bolts 56*f* through 56*h*. This is possible since plate 58 is flexible and will be deformed to allow further movement of diaphragm 20 upwardly subsequent to the initial contact between plate 58 and bolt 56*a*.

The purpose of washer 60, that is resilient, is to exert a downwardly directed force on plate 58 to prestress and deflect plate 58 such that the initial contact between the plate and bolt 56*a* will be sufficiently firm to insure electrical connection between these elements.

One portion of diaphragm 20 has integrally formed therewith an extension 64 that is positioned between the upper and lower housing portions 12 and 14 respectively. Diaphragm portion 64 is electrically connected by means of a conductor 66 to an ammeter 68.

From the above description of the parts, it may be seen that an electrical circuit is completed from current source 36 through conductor 34, male terminal 32, female terminal 30, the printed circuit on circuit board 38, sleeve 52, bolts 56*a*–56*h*, switching plate 58, diaphragm 20 and conductor 66 to ammeter 68 whenever diaphragm 20 is in the uppermost position. The current indicated by ammeter 68 is dependent solely on the total resistance of this circuit since current source 36 has a substantially constant electrical potential.

The significance of this circuitry may be appreciated by reference to FIG. 4 of the drawing. At the center of the circuit diagram of FIG. 4 may be seen the projection 42 on electrical terminal 30 through which current passes to the printed circuit formed on circuit board 38. The conductive elements 46, having electrical resistance, are designated in FIG. 4 as resistors $R_1$ to $R_8$. It may be seen that each of these electrical resistances is connected in parallel to the others and in series to one of the conductive bolts 56*a* to 56*h*. Since these bolts are progressively contacted by switching plates 58 as explained above, plate 58 is illustrated as a plurality of electrical switches, capable of contacting one or more of the bolts 58*a*–56*h* that serve as electrical switch contacts.

With no pressure present in lower chamber 16, switching plate 58 is remote from all of the bolts 56*a*-56*h*. Upon sufficient pressure being admitted to lower chamber 16, however, switching plate 58 will contact bolt 56*a*—the bolt that protrudes the greatest distance into upper chamber 18. A circuit thus will be completed from terminal enlargement 42 through resistance $R_1$, bolt 56*a*, and switch plate 58 to conductor 66 and ammeter 68. The current shown by ammeter 68 under these circumstances may be determined by the formula $$I=\frac{E}{R_1}$$

where I is the current, E is the electrical potential of current source 36 and $R_1$ is the electrical resistance of resistor $R_1$.

As pressure increases in lower chamber 16, upward movement of diaphragm 20 will cause switch plate 58 to progressively contact bolts 56*b*, 56*c* and so on until all of the bolts are contacted. With more than one bolt contacted by switching plate 58, the current indicated by ammeter 68 may be determined from the formula $$I=\frac{E}{R_T}$$

where $R_T$ is the total resistance of the circuit. This total resistance may be determined by the formula $$\frac{1}{R_T}=\frac{1}{R_1}+\frac{1}{R_2}\cdots+\frac{1}{R_n}$$

As each successive bolt is contacted, the total resistance will decrease and the ammeter reading will be higher, corresponding to a higher pressure in lower chamber 16. The value of resistances $R_1$ through $R_8$ may be chosen empirically so that the reading of ammeter 68 will vary linearly with increases in pressure in lower chamber 16.

FIGS. 5 and 6 illustrate a second embodiment of printed circuit and wherein numerals are similar to the numerals of FIGS. 1 to 4 but are primed. It may be seen that printed circuit board 38′ has formed therethrough a central aperture 40′ and a plurality of peripheral apertures 48′ through which extend bolts 56*a′*–56*h′*. These bolts are connected in series circuit by a plurality of printed conductive members 46′, each having an electrical resistance and referred to in FIG. 6 as $R_9$–$R_{16}$. In this embodiment of the invention, bolt 56*g′*, extends the greatest distance into upper chamber 18 and is followed by bolts 56*h′* through 56*f′*.

With switch plate 58′ remote from bolt 56*g′*, the circuit is open and no current will be registered by ammeter 68′. Upon the pressure in lower chamber 16 being sufficient to urge the diaphragm and switching plate 58′ upwardly so that the latter contacts bolt 56*g′*, a circuit is completed from terminal enlargement 42′ through all of the resistances $R_{16}$–$R_9$, bolt 56*g′* and switching plate 58′ to conductor 56′ and ammeter 68′. The current indicated by ammeter 68′ under these conditions may be determined by the formula $$I=\frac{E}{R_T}$$

where $R_T$ is the sum of the individual resistances $R_9$–$R_{16}$.

Subsequent upward movement of switch plate 58′ will cause contact between the switch plate and bolts 56*h′* to be made. This contact will cause resistance $R_9$ to be shorted out and will decrease the total resistance of the circuit and subsequently cause a larger reading on ammeter 68′. As each successive bolt is contacted, another resistance is shorted out until finally, with bolt 56*f′* in contact wiht plate 58′, only resistance $R_{16}$ will remain in the circuit.

The embodiment of the invention illustrated in FIGS. 5 and 6 has the advantage of not requiring that different resistors have different values. Thus resistances $R_9$ through $R_{16}$ may each of the same individual resistance value in order that the readings of ammeter 68′ vary linearly with the pressure present in lower chamber 16. This feature allows circuit board 38′ and its printed circuit to be manufactured at a cost substantially less than printed circuit board 38 of FIG. 3.

It thus may be seen that this invention provides an electric pressure gauge that may be constructed simply and economically from easily fabricated parts and shelf items such as the common bolts used as electrical contacts. The design of the device of this invention is reliable in use and should provide accurate monitorings of such pressure sources as internal combustion engine lubricating systems for the life of the internal combustion engine.

I claim:

1. Pressure measuring apparatus comprising: a housnig defining a central chamber, an impervious resilient member secured to said housing and dividing said chamber into two parts, said housing having conduit means formed therein connecting one of said chamber parts to a source of pressure to be measured, an electrical circuit element secured to said housing and positioned in the other of said chamber parts, said circuit element including a plurality of electrical resistances, a plurality of electrical contacts mounted by said housing, each of said contacts being electrically connected to at least one of said resistances, each one of said contacts extending into said other chamber part a different distance than the other of said contacts, first electrically conductive means connecting said circuit element to a source of current having a substantially constant electrical potential, said resilient member normally being spaced from said contacts and having an electrically conductive switching member secured thereto for movement therewith, and second electrically conductive means connecting said switching member to gauge means capable of measuring electric current, whereby said resilient member and said switching member move towards said contact in response to pressure present in said one chamber part such that said switching member progressively is electrically connected to said contacts to vary the effective resistance of said circuit element.

2. The pressure measuring apparatus of claim 1, wherein said resilient member is a diaphragm constructed of electrically conductive material, and said second electrically conductvie means includes said diaphragm.

3. The pressure measuring apparatus of claim 1 wherein said switching member comprises a flexible plate secured to said resilient member within said other chamber part, said apparatus further comprising a second resilient member mounted on said first resilient member, bearing on said plate and deflecting said plate away from said electrical contacts.

4. The pressure measuring apparatus of claim 1, wherein said plurality of electrical resistances are connected in parallel circuit.

5. The pressure measuring apparatus of claim 1, wherein said plurality of electrical resistances are connected in series circuit.

6. Pressure measuring apparatus comprising: a housing defining a central chamber, an impervious resilient diaphragm dividing said chamber into two parts, said housing having conduit means formed therein connecting one of said chamber parts to the source of pressure to be measured, a plurality of electrical contacts mounted on said housing, each one of said contacts extending into the other of said chamber parts a different distance than the other of said contacts, each one of said contacts being electrically connected to a common source of electrical current by one of a plurality of current paths, each of said current paths having a different electrical resistance, said diaphragm normally being spaced from said contacts and having an electrically conductive switching member secured thereto for movement therewith, and electrically conductive means connecting said switching member to an ammeter, whereby movement of said diaphragm and switching member in response to pressure in said one chamber part causes progressive electrical connection between said switching member and said contacts to vary the electrical resistance between said current source and said ammeter.

7. The pressure measuring apparatus of claim 6, wherein said diaphragm is electrically conductive, and said electrically conductive means include said diaphragm.

References Cited

UNITED STATES PATENTS

| | | | |
|---|---|---|---|
| 3,238,487 | 3/1966 | Le Van et al. | 73—398 XR |
| 3,445,801 | 5/1969 | Sattler | 73—398 XR |

DONALD O. WOODIEL, Primary Examiner

U.S. Cl. X.R.

200—83